US008468306B2

(12) United States Patent
Tsai et al.

(10) Patent No.: US 8,468,306 B2
(45) Date of Patent: Jun. 18, 2013

(54) MICROPROCESSOR AND METHOD FOR DEFERRED STORE DATA FORWARDING FOR STORE BACKGROUND DATA IN A SYSTEM WITH NO MEMORY MODEL RESTRICTIONS (75) Inventors: Aaron Tsai, Poughkeepsie, NY (US); Barry W. Krumm, Poughkeepsie, NY (US); James R. Mitchell, Poughkeepsie, NY (US); Bradley Nelson, Austin, TX (US); Brian D. Barrick, Pflugerville, TX (US); Chung-Lung Kevin Shum, Wappingers Falls, NY (US); Michael H. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/031,858

(22) Filed: Feb. 15, 2008

(65) Prior Publication Data
US 2009/0210632 A1     Aug. 20, 2009

(51) Int. Cl.
*G06F 9/38*     (2006.01)
(52) U.S. Cl.
USPC ............ 711/141; 711/140; 711/169; 712/219
(58) Field of Classification Search
None
See application file for complete search history.

(56) References Cited

U.S. PATENT DOCUMENTS

| 5,860,107 | A  | * | 1/1999  | Patel ............................ 711/140 |
| 6,393,536 | B1 |   | 5/2002  | Hughes et al. |
| 6,662,280 | B1 |   | 12/2003 | Hughes |
| 6,915,395 | B1 |   | 7/2005  | Singh |
| 6,937,354 | B2 |   | 8/2005  | Kobayashi et al. |
| 7,065,632 | B1 |   | 6/2006  | Col et al. |
| 7,149,878 | B1 |   | 12/2006 | Jensen et al. |
| 2006/0047912 | A1 | | 3/2006 | Chinnakonda |
| 2007/0180440 | A1 | | 8/2007 | Pechanek |
| 2007/0260855 | A1 | | 11/2007 | Gschwind et al. |

* cited by examiner

*Primary Examiner* — Christian P Chace
*Assistant Examiner* — Alan Otto
(74) *Attorney, Agent, or Firm* — Cantor Colburn LLP; John Campbell

(57) ABSTRACT

A pipelined processor includes circuitry adapted for store forwarding, including: for each store request, and while a write to one of a cache and a memory is pending; obtaining the most recent value for at least one block of data; merging store data from the store request with the block of data thus updating the block of data and forming a new most recent value and an updated complete block of data; and buffering the updated block of data into a store data queue; for each additional store request, where the additional store request requires at least one updated block of data: determining if store forwarding is appropriate for the additional store request on a block-by-block basis; if store forwarding is appropriate, selecting an appropriate block of data from the store data queue on a block-by-block basis; and forwarding the selected block of data to the additional store request.

16 Claims, 4 Drawing Sheets

MICROPROCESSOR AND METHOD FOR DEFERRED STORE DATA FORWARDING FOR STORE BACKGROUND DATA IN A SYSTEM WITH NO MEMORY MODEL RESTRICTIONS

BACKGROUND OF THE INVENTION

The invention herein relates to architecture of a processor, and in particular to an architecture for avoiding store-hit-store issues in a microprocessor.

For some microprocessors that implement store forwarding mechanisms, special problems may arise when there are multiple stores to one block in the pipeline. If the background data is accessed for a store and from the cache before all preceding stores for the block have been written to the cache, a problem arises. More specifically, a problem will exist where the background data read from the cache is old and cannot be used for merging to create an up-to-date block of data. As perspective, consider operation of a processor in general.

Most processors run programs by loading an instruction from memory and decoding the instruction; loading associated data that is needed to process the instruction; processing the instruction; and storing any associated results in registers or memory. Complicating this series of steps is the fact that access to the memory, which includes the cache, main memory (i.e., random access memory) and other memory such as non-volatile storage like hard disks, (not shown) involves a lengthy delay (in terms of processing time).

One technique to improve performance is the use of "pipelining." Pipelines improve performance by allowing a number of instructions to work their way through the microprocessor at the same time. For example, if each of the previously mentioned four steps of running programs is implemented as a pipeline cycle, then microprocessor would start to decode (in the first step) a new instruction while the last instruction waits for results to continue. This would allow up to four instructions to be "in flight" at one time, making the microprocessor appear to be up to four times as fast. Although any one instruction takes just as long to complete (there are still four steps) the microprocessor as a whole "retires" instructions much faster and can be run at a much higher clock speed than in prior designs.

Unfortunately, in a pipelined microprocessor, a special condition exists. This condition is commonly referred to as "store-hit-store." In store-hit-store, a store (also referred to herein as an "update" or a "write") to the cache is generated and designated for an address(es). Concurrently, another store is designated for at least a portion of the same address (es).

As constant, fixed size blocks of data are simpler to transfer and manipulate then variable size blocks of data, it makes sense to use a single fixed block size as much as possible. However, not all data in a block may require update. Accordingly, a certain portion that is not updated is referred to as "background data."

Thus, for a pipelined microprocessor that can store data of variable lengths into a cache or memory hierarchy, it may be advantageous, at least some of the time, to merge this variable length store data into a larger fixed size block such that a fixed size up-to-date block of data may be passed on to the rest of the cache or memory hierarchy as the result of the store.

One problem that arises is that there may be multiple stores in the pipeline to the same block of the cache such that when a newer store reads the cache for its background data, the background data is not the correct, most recent value for that store due to an outstanding older store to that same block that has not yet written the cache.

What are needed are techniques for solving an overlap of stores. The techniques should guarantee that the correct background data will always be written into the background data register (either by the cache or by older stores to the same block) before the background data is needed for store merging and provide minimal impact upon system performance.

BRIEF SUMMARY OF THE INVENTION

An embodiment of the invention includes a pipelined processor including circuitry adapted for store forwarding, the microprocessor including circuits for performing: for each store request, and while a write to one of a cache and a memory is pending; obtaining the most recent value for at least one complete block of data; merging store data from the store request with the complete block of data thus updating the block of data and forming a new most recent value and an updated complete block of data; and buffering the updated complete block of data into a store data queue; for each additional store request, where the additional store request requires at least one updated completed block of data: determining if store forwarding is appropriate for the additional store request on a block-by-block basis; if store forwarding is appropriate and the data is available in a store data queue, selecting an appropriate block of data from the store data queue on a block-by-block basis and forwarding the selected block of data to the additional store request to be used as the most recent value; or if store forwarding is appropriate and the data is not available in the store data queue, recording the queue entry number for the additional store request in a cold forwarding state for the store queue entry that would have been forwarded.

An embodiment of a method for storing data in a pipelined processor, includes: issuing a store request that includes a store address; determining if the store address matches an address in a store address queue; if there is no match, then reading out store background data from a cache of the processor based on the address and writing the store queue with the address and background data and setting a most recent state bit; if there is a match, then determining if the entry in the store address queue including a set most recent state bit includes store data for forwarding, and if not, then for the most recent entry in the store address queue that matched, updating a cold forwarding state of the matching entry to point to a new entry in a store queue for the store request, resetting the most recent state bit and writing a store address and setting a state bit of the new entry signifying the most recent entry.

BRIEF DESCRIPTION OF THE DRAWINGS

Referring now to the drawings wherein like elements are numbered alike in the several figures, where.

DETAILED DESCRIPTION OF EXEMPLARY EMBODIMENTS

Disclosed herein are aspects of microarchitecture for a microprocessor 1. In particular, the microarchitecture provides features and functions for storing data. Aspects of the microarchitecture are shown in FIGS. 1, 2, 3 and 4 and as otherwise discussed herein.

Figure 1:
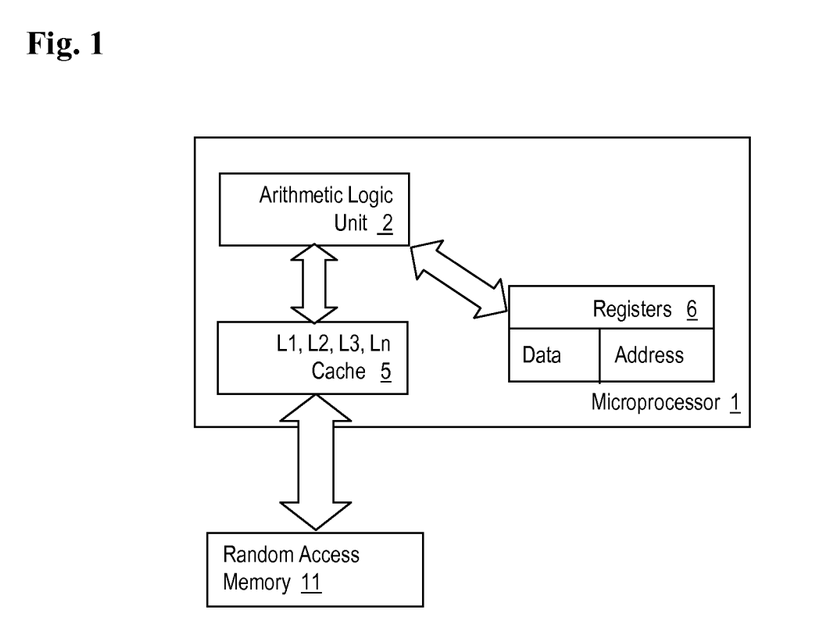
FIG. 1 is a block diagram presenting aspects of architecture for a processor.

FIG. 1 depicts aspects of an architecture (also referred to as a "microarchitecture") for a processor or microprocessor 1. First, note that FIG. 1 is a simplified depiction for purposes of discussion and does not take into account that each processor or microprocessor 1 may include pluralities of various components.

The microprocessor 1 typically includes components such as one or more arithmetic logic units 2, one or more cache 5, and a plurality of registers 6. Typically, the cache 5 provides an interface with random access memory 11. Of course, a variety of other components are typically included in the microarchitecture, but are not shown here for simplicity.

Two architectural or microarchitectural requirements or variables that may affect embodiments described herein are the smallest granularity of data that can be addressed and loaded from memory and the largest granularity of data that can be addressed and loaded from memory. It is assumed that these two variables are not necessarily the same. How these (and other) requirements and variables may affect embodiments of the invention are described, at least in part, below.

For convenience, some additional definitions are provided. First, as used herein, the term "load" is used generally and makes reference to an instruction for loading data from memory 11 or the cache 5 into a register 6 (also referred to as a "load request," a "read" and by other similar terms), as well as the process of loading from memory 11. In some instances, the term "load" makes reference to data recently retrieved from memory 11. Similarly, the term "store" is used generally and makes reference to an instruction for storing data from a register 6 into at least one of the cache 5 and memory 11 (also, referred to as a "store request," an "update" and by other similar terms). In some instances, the term "store" makes reference to data recently written to at least one of memory 11 and the cache 5. The store may relate to certain targets, such as a store data queue. The term "granularity" generally refers to a size of data in relation to computation or access to computing resources.

The microarchitecture as described herein solves various problems associated with loading and storing of data. In particular, and as described herein, the microarchitecture solves the problem of store-hit-store by guaranteeing that the correct most recent background data will be written into the background data register (either by the cache 5 or by older stores to the same block) before the background data is needed for store merging. First, general aspects of the microarchitecture are provided as well as a limited examination of how the microarchitecture addresses certain aspects of load-hit-store.

That is, the microarchitecture disclosed and claimed herein provides for forwarding of store data prior to the writing of cache 5 or memory 11 for the store. Accordingly, store forwarding solves the problem of waiting for store writes to the cache 5 or memory 11.

As an overview, the enhanced microarchitecture 100 provides for saving off (buffering) snapshots of the most current values of memory 11 into a store data queue after each store. The most current values in the store data queue include both data that is updated by the store as well as data that is not updated (data not yet updated by the store is referred to herein as "background data"). Then, using control logic and the results of address compares, a determination is made as to whether store forwarding can be used to avoid the normal penalties of load-hit-store and which store data queue entry should be forwarded. The data forwarded from the store queue entry is used as a contiguous block of data that acts as a complete replacement for the data normally loaded from the cache 5. Note that the block size (which is the store data queue entry size) can be smaller than the normal cache return size and can replace only part of the overall cache return (with the rest of the return data still referencing the cache data). In this way, there is no need for subset or superset memory area overlap restrictions on either the load or the store(s), since each part of the load data can either reference the cache data or store forward data from any queue entry. Accordingly, different queue entries (meaning different stores) can independently be used to forward to the different parts of any given load.

Also for convenience, a discussion of aligned data, unaligned data and memory ranges is provided. In this regard, a "sub-block" describes the smallest granularity of memory 11 that can be addressed by a load or store, and all loads and stores access or update an integral number of sub-blocks. Then assume that an exemplary embodiment of enhanced microarchitecture 100 has a sub-block size of one (1) byte. The exemplary embodiment defines a word to be four (4) bytes and a double-word to be eight (8) bytes. By convention, an aligned range of data always begins at a memory address that is an integral multiple of its length. For example, an aligned double-word always starts on a byte address that is an integral multiple of eight (8) and includes all the bytes up until the next byte address that is a multiple of eight (8) (for a total length of eight (8) bytes). Assume the largest granularity of memory that is used for storage by a single instruction is eight (8) bytes (with a minimum length of one (1) byte and no restrictions on starting or ending address so the data can be unaligned). Then assume that each store pipe can perform one store instruction each cycle and that there are two store pipes that can independently send store data into a Load/Store Unit at the same time in the cycle. Also, assume that there are two (2) load pipes and each load pipe can access one (1) aligned even double-word and one (1) odd aligned double-word of data and the even and odd double-word of data do not necessarily belong to the same aligned quad-word of memory but are contiguous (an even double-word is a double-word that begins at an even integral byte address of 8, and an odd double-word begins at an odd integral byte address of eight (8)). Note that depending on the embodiment, there typically may be other restrictions for returning both even and odd DWs on a given pipe. For example, it may be required that both even and odd DWs belong to the same cache line entry for both to return the correct data from the cache. The structure of the cache 5 would be built to support these load return requirements. For example, if the address width is 64 bits with bit 0 as the most significant address bit and bit 63 as the least significant bit, then bit 63='0' would describe all the even bytes and bit 63='1' would describe all the odd bytes. Then this would mean that any access to bytes with address bit 60='0' would be to an even double-word and any access to bytes with address bit 60='1' would be to an odd double-word. For the even and the odd double-word to be allowed to be different quad-words would mean that address bits 0:59 could be different. Then, a cache structure to support this load bandwidth requirement would have one half of the cache supporting requests to all bytes that have address bit 60='0' (even double-words) and one half of the cache supporting requests to bytes that have address bit 60='1' (odd double-words). Each cache half would need to be able to take requests to different address bits 0:59, and each cache half would then support up to two (2) independent requests at once since there are two (2) independent load pipes.

Given the base design descriptions, one embodiment includes a block size the same as the largest contiguous data return from the cache, which is one (1) double-word. In this implementation, the block size is used as the store data queue entry size. In this embodiment, the largest aligned contiguous data return from the cache determines the largest granular data size that is loaded from memory. Since the cache return from each cache half is one (1) double-word that is aligned to storage boundaries (eight (8) bytes starting with address bits 61:63='000'b and ending with address bits 61:63='111'b), an easy implementation for store forwarding makes the data in the queue entry storage aligned. If the store data queue entries are storage aligned, then the data queue entries are split into two (2) halves, one (1) for even double-words and one (1) for odd double-words, similar to the cache. This provides an easy correlation between queue entries and the cache for store forwarding, and also provides a way to handle store data that can be eight (8) bytes in size (which is not necessarily aligned to memory boundaries). Because the stores are contiguous and the maximum store size is eight (8) bytes, the design can only update bytes in up to two (2) different memory aligned double-words (in this embodiment), and in particular it can only update at most one (1) even double-word and one (1) odd double-word (though the even double-word may be updated first and then the odd double-word or vice-versa).

Note for this embodiment, there are advantages in dealing with block sizes that are based on the largest granularities of data manipulation and data transfer supported by the microprocessor (double-word) rather than with the smallest granularities of data manipulation required by the architecture (byte). When using a large block size matching the maximum data granularity (as detailed above), at most two (2) sets of independent compares and controls are needed to manipulate the two (2) blocks. If the smallest block size was used (byte), then there would need to be at least as many independent sets of compares and controls as the largest data size divided by the minimum block size which in this embodiment would be eight (8) sets of compares and controls (one (1) set for each byte in a double-word).

In this embodiment, the overall structure used to handle all stores and is referred to as a "store queue." A store queue includes of one or more entries, with each entry including a starting address register, an ending address register, a starting data register, an ending data register, and some control states (such as valid bits). The data registers hold memory aligned double-word blocks such that the starting data register would hold memory contents directly associated with the entry's starting address 0:60, and the ending data register would hold memory contents directly associated with the entry's ending address 0:60. The portion of the store queue all the address registers is referred to as the store address queue. The portion of the store queue including all the data registers is referred to as the store data queue.

Figure 2:
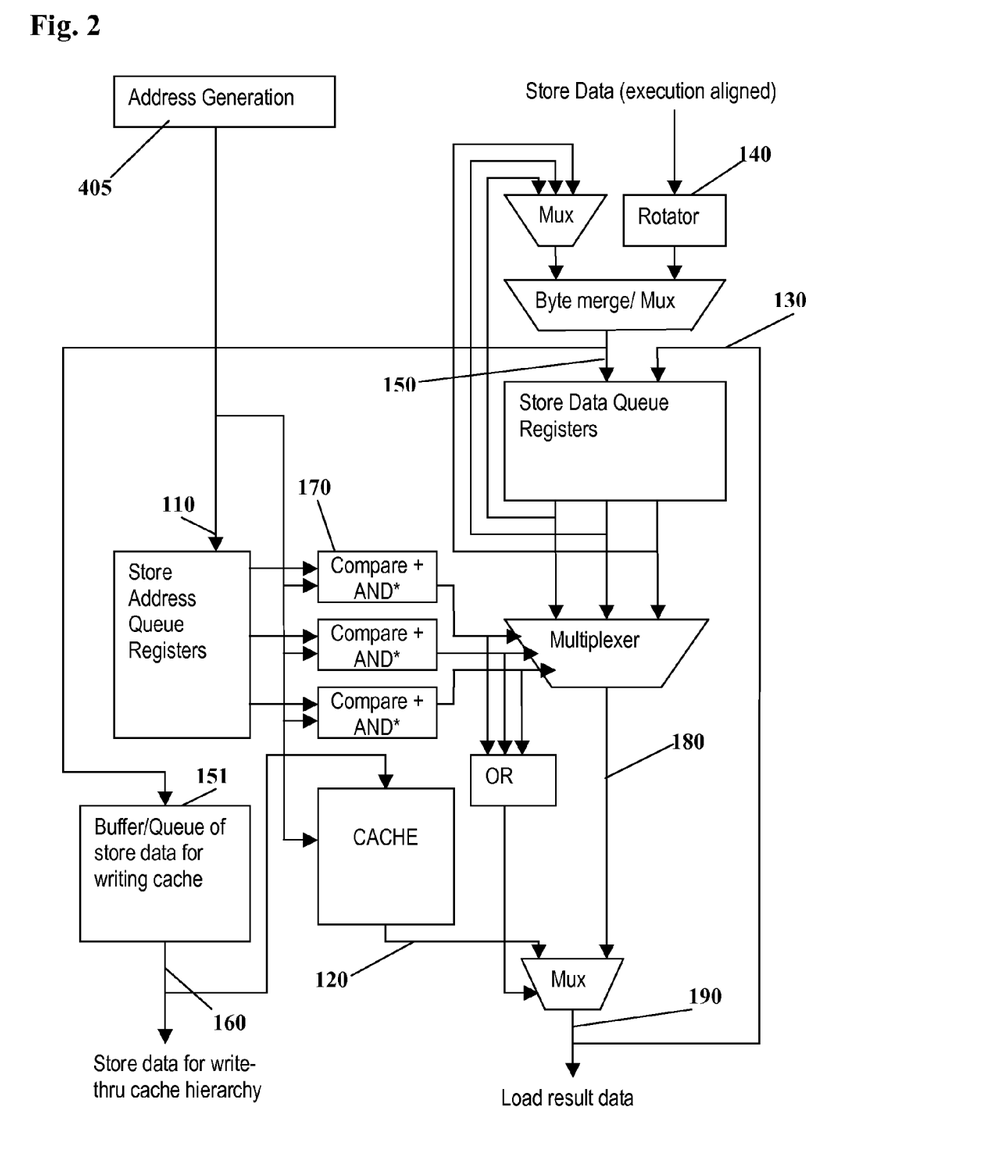
FIG. 2 is a block diagram illustrating exemplary and functional aspects of a microarchitecture.
Figure 3:
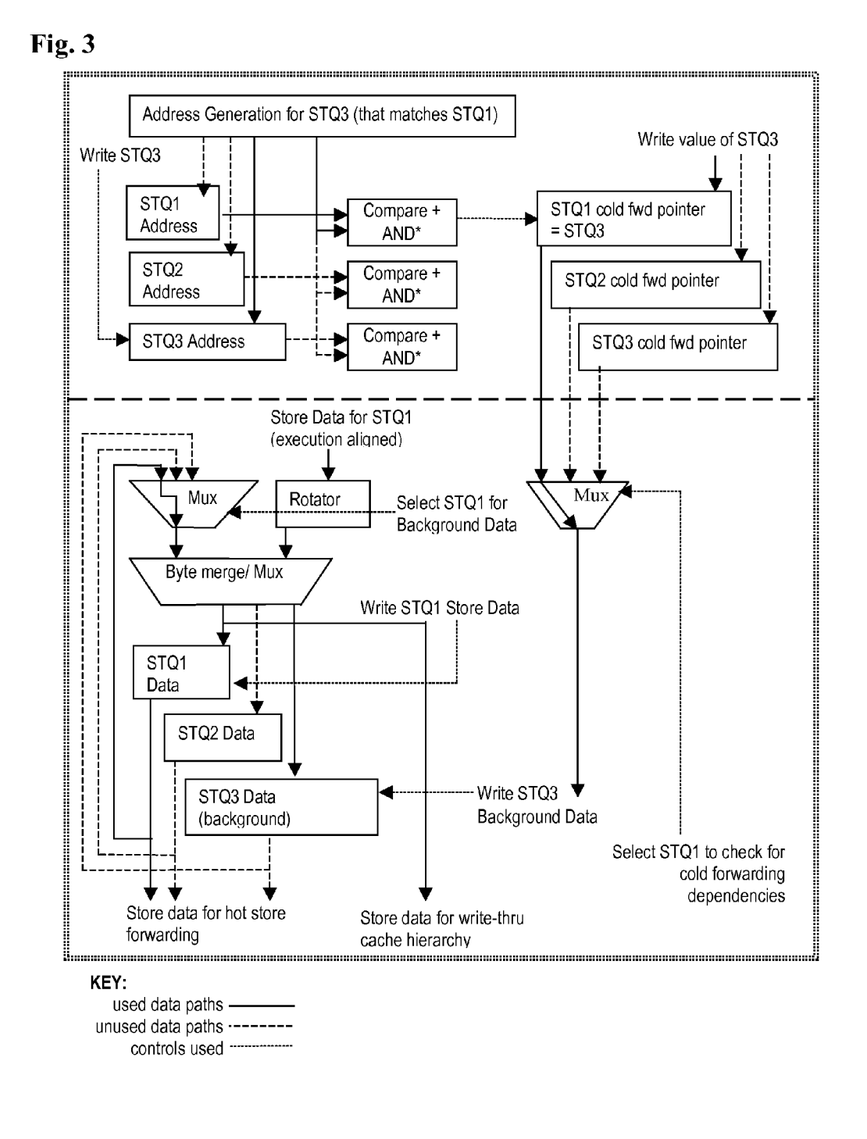
FIG. 3 is an exemplary block diagram showing a three entry store queue with cold background data forwarding from store queue entry 1 (STQ1) to store queue entry 3 (STQ3)
Figure 4:
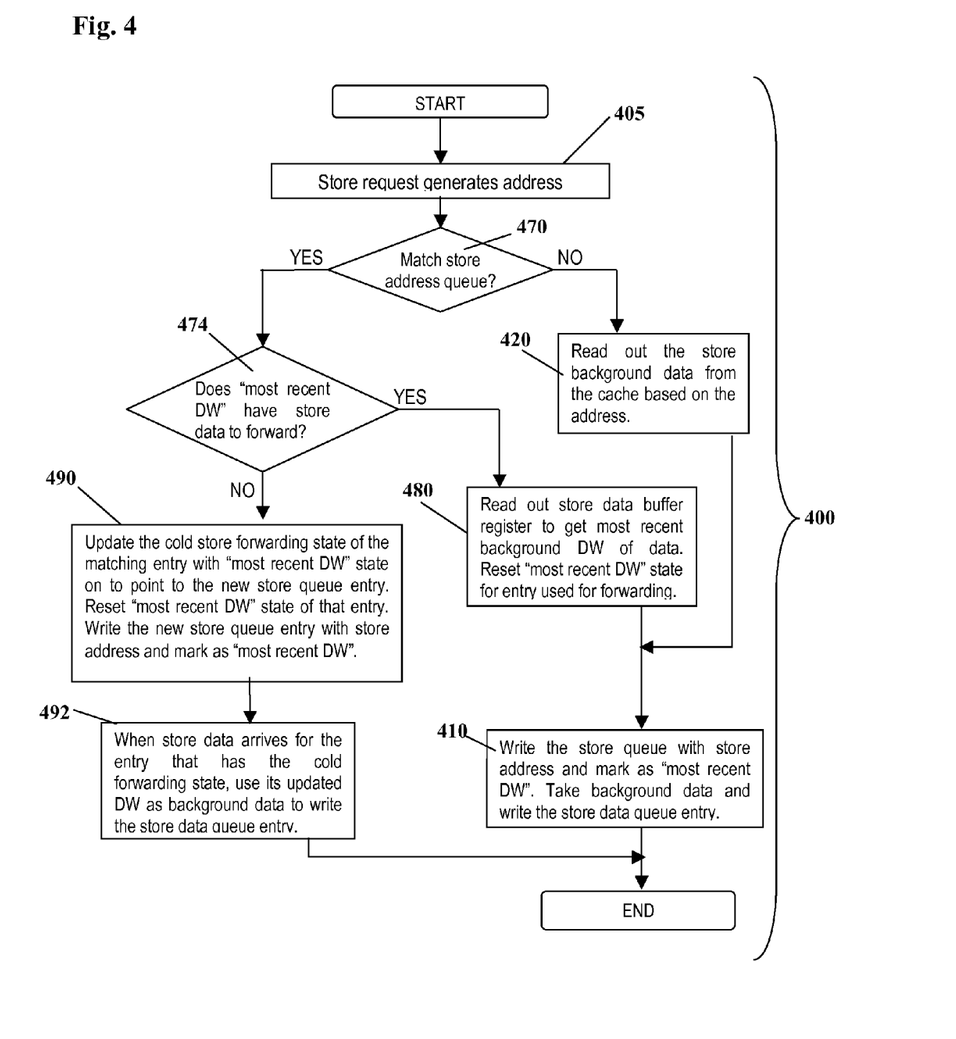
FIG. 4 is a flowchart depicting an exemplary process for fulfilling a store address request and generating background data.

Refer now to FIGS. 2, 3, and 4 which present block diagrams showing aspects of implementation of the microarchitecture. FIG. 2 depicts an embodiment showing three (3) store address queue and store data queue entries, while FIGS. 3 and 4 are exemplary flow charts that show general aspects of handling store address requests.

Assume that the microprocessor 1 requests loads and stores with their addresses in program order, and that store data is always presented in order, and that the store address is always available before the store data is presented. The processing of a store would involve taking the address of the store request 405 and writing the address (and other request related information) into a store address queue 110/410. At the same time, the store would be treated as a load and the data from the cache for that address location would be accessed 120/420. This data is accessed from the cache in order to have all the bytes of the memory aligned double-word available that may not be updated for the store (the "background data"). The memory aligned double-word or two (2) double-words of background data for the store 130 are then written into the appropriate store queue entry (or entries) reserved for the store. When the store result data is available, the store data is shifted or rotated as necessary to align the store bytes to memory boundaries 140. Then the store data is written into the associated store queue entry, but only the appropriate bytes are updated such that the background data that is already saved off in the store data queue entry is replaced by the store data 150. This process is referred to as "byte merging" the store data onto the background data. The resulting even and/or odd double-words in the store queue that are the result of byte merging are now the correct and most recent values of the double-word for the state of the microprocessor (and overall system) at the time of the completion of the store. The queue entry or entries can now be tagged as valid for store forwarding for any following instructions that need to access those double-words. The queue entry or entries are now also valid for writing the entire contents of the double-word into the cache hierarchy 160.

For a load, first the address of the load is compared to all the stores that are ahead of it in the pipeline that have not yet written their stores into the cache 170. This embodiment assumes the microprocessor 1 is making load and store requests with addresses in program order, so all stores that are ahead of this load have known addresses that are written into the store address queue. For all cases where the addresses for the bytes of the load overlap with any addresses for the bytes that are being stored and have not yet written the cache, there are one (1) of two (2) results.

In a first result, there are one (1) or more bytes of the load where the most recent store data has not yet been merged with double-word based background data and written into the store data queue (store forwarding valid bit is off). In this case, the load-hit-store condition is not resolved with store forwarding and the load request cannot be processed at this time.

As an alternative, all of the bytes of the load that overlap with store data correspond with most recent store data that have already been merged with background data such that the most recent value or values for the memory aligned double-word or double-words associated with those bytes are available in the store data queue (all required store forwarding valid bits are on). In this case, the load-hit-store condition can be resolved by using the appropriate double-words of data from the store data queue corresponding to the most recent double-word for those double-words of the load that contain bytes that overlap with stores that have not yet written the cache 180. These double-words from the store data queue should be used as the load data instead of double-words of data from the cache 120 (normally implemented using a 2:1 multiplexer (mux) 190).

One method that may be used by the microarchitecture for determining the most recent double-word of data is to also use double-word address compares 170/470 for store requests. The results of these address compares are used to determine which store queue entries should have their "I am the most recent double-word" state bits reset at the same time that the current store request sets the "I am most recent double-word" state bit for its store queue entry (or entries). In this way, there should always only be at most one store queue entry with its "I am most recent double-word" state bit on for any given memory aligned double-word. These state bits can then be ANDed with any store address queue entry compares to determine which of the compares corresponds to the entry that is the most recent for that double-word. In addition, the store forwarding valid bits can be ANDed with the compares and the most recent double-word state bits to determine whether the most recent store data queue entry can be used for store forwarding and replace the cache data 170.

As the background data for stores may not always be able to access the most recent data value from the cache, a further technique used by the microarchitecture is now described. Note that in this context, the background data access is like a load in that the most recent data may not yet be available because a store ahead of it in the pipeline has not yet written its store data into the cache. In particular, this becomes a problem when the stores that are ahead in the pipeline need to write to the double-word that the current store needs as background data, but the bytes of the stores that are ahead are not pure subsets of the bytes of the current store (for that double-word) such that they truly modify bytes that are background data that will not be overwritten by the current store.

Using the same terminology as load-hit-store, this situation can be termed a "store-hit-store" or background data-hit-store. In this embodiment, the solution to this store-hit-store problem is to simply treat each store request with address like a fetch request with address and solve the store-hit-store problem for stores in the same way that the load-hit-store problem is solved for loads. The results of address comparisons with the store address queue 170/470 that were used for loads as part of the load-hit-store solution are now used as part of the store-hit-store solution. Like loads, store background data can only be forwarded from store queue entries that have the "I am most recent double-word" state and that already have their store data 474. There may be situations where the store-hit-store problem cannot be resolved using store forwarding from the store queue (one example would be the store data is not yet available for forwarding), but this same problem would exist for regular load-hit-store situations that cannot be resolved with store forwarding. This problem can be solved by taking the same action as a load-hit-store situation where a delay of the load (or store) is necessary, or some other special solutions must be used. If the store-hit-store problem can be resolved using store forwarding, then for the appropriate double-words, the data from the most recent store data queue entry 180/480 is used to write background data into the store data queue entry 190 for the current store instead of data from the cache 120/420. As mentioned above, additionally this situation would result in the store queue entry that was considered most recent for this double-word (and that was the source for the current store request background data) to result in getting its "I am most recent" state bit reset (due to the address compare) 480 and for the current store request to get its "I am most recent" bit set, thus correctly updating which store queue entry is most recent and avoiding having multiple entries to the same double-word tagged as most recent.

Again note that there are situations when store forwarding is not useful for addressing a load that is dependent on store data that is not yet available at the time of instruction dispatch. If background data relies on purely dispatch-time store forwarding mechanisms, it will have this same problem.

Accordingly, embodiments of the invention disclosed herein take advantage of a unique property that exists between load instructions and background data to provide for storing instructions. Load data is generally required at the time the address is used by the cache, but in many processors, the address for stores is always presented before the store data. In addition, if store addresses and store data are always presented in instruction order, at the time that store data is presented for a store, all previous store data to the same block can be known, and previous store data to that block will have been received.

In general, a determination is made regarding whether respective background data for a store will be updated by any previous store by saving off store addresses and performing address comparisons. If there is a match, the most recent store that has a match will update a "cold" forwarding state to remember that some newer store has background data that is dependent on its storage update.

When any store receives the respective data, the cold forwarding state is checked. If the cold forwarding state exists, the store data will be merged to form a new, latest version of a block of storage. Subsequently, the new, latest block will be used to overwrite the background data register of the background data that is dependent on getting the most recent value of this block as indicated by the cold forwarding pointer.

In general, the microarchitecture provides for receiving the addresses of stores in program order and saving off these addresses into store address queue registers which in addition to a data register and some control states makes up a store queue entry. Each time a store address is received, it is compared against all valid addresses in store queue (which by design are all of the older stores in the pipeline that still have not yet written the cache). If a compare is detected for a valid store queue entry, and that entry is also determined to be the most recent store to that address (using a "I am most recent" state flag), then the "I am most recent" state is removed from that entry, and instead a "cold" forwarding state is applied to that store queue entry which points to the store queue entry that will be written by the new store address that was just received. The store address queue entry for the new store automatically gets the "I am most recent" state. Then later when store data is received, the cold forwarding states of its associated store queue entry are checked. If a cold forwarding state is detected, and then after the store data is merged into the background data for a fully merged store block, the merged store block will write (update) the background data register that is pointed to by the cold forwarding state. This would be in addition to any other uses of this merged store block (such as writing the data register associated with its own store queue entry for later "hot" store forwarding). As long as the store data is received in program order and it is after the store address is received (and writes the store address queue and store forwarding states), then each store is guaranteed to have correct most recent background data due to any preceding store to the same block updating the background data at the time its store data was received. This allows for a series of "waterfall" effects of current up-to-date fully merged store blocks being used (if necessary) to ensure current up-to-date background data blocks for future stores which in turn will ensure that the future stores will be able to generate up-to-date fully merged store blocks. Having as many fully merged store blocks as possible for stores is useful since the blocks can be used for store forwarding for loads as well as for updating other caches and structures in the memory subsystem.

Note that in FIG. 3, a top portion of the figure represents the timeframe of when the store address is presented. The bottom portion represents the timeframe of when the store data is presented. More specifics are now provided, in particular with reference to FIG. 4.

A method for store data forwarding 400 is presented in FIG. 4. In this example, results of address comparisons with the store address queue 170/470 that were used for loads as part of the load-hit-store solution are now used as part of the store-hit-store solution. Like loads, store background data can only be forwarded from store queue entries that have the "I am most recent double-word" state and that already have their store data 474. There may be situations where the store-hit-store problem cannot be resolved using store forwarding from the store queue (one example would be the store data is not yet available for forwarding) 471. This problem can be solved by taking the same action as the load-hit-store situation or some other special solution must be used. If the store-hit-store problem can be resolved using store forwarding, then for the appropriate double-words, the data from the most recent store data queue entry 180/480 is used to write background data into the store data queue entry 190/490 for the current store instead of data from the cache 130/430. As mentioned above, additionally this situation would result in the store queue entry that was considered most recent for this double-word (and that was the source for the current store request background data) to result in getting its "I am most recent" state bit reset (due to the address compare) and for the current store request to get its "I am most recent" bit set, thus correctly updating which store queue entry is most recent 474 and avoiding having multiple entries to the same double-word tagged as most recent.

In review, assume each storing instruction delivers a beginning and ending address for the store before delivering the store data and that these store addresses are presented in program order. The store addresses are written into a store address queue as part of a store queue entry, and the new entry turns on a "I am the most recent store to this double-word" state. In parallel, the store address bits 0:60 are compared against all the store address bits 0:60 of currently valid entries in the store queue. Since all store addresses are delivered and written into the store queue in program order, only stores that are older than the current store would be valid in the store queue. If this compare matches on any valid address, first the matching entry that has its "I am the most recent store to this double-word" state on gets this state reset (since the current store will now become the most recent store to the double-word instead). Also, this means the current store is modifying a double-word that one or more previous stores (that have not yet updated the cache) are also modifying. As a result, the most recent background data for the current store cannot be acquired from the cache since the cache has not yet been updated with all older stores to the same double-word. If the correct background data is not in the cache, another possibility is that all of the older stores have at least delivered their store data and merged the store data with their background data to create the most recent value of this double-word in some location (register) outside of the cache. In this case, if "hot" store forwarding is supported, then the contents of this store forwarding register could be used as background data instead of the cache. However, there is another possibility that the most recent store to this double-word has not yet even delivered its store data at the time that the current store address is being delivered. In this case, the most recent background data is yet to be generated and known. One possible solution to this would be to halt execution of the current store using some mechanism (for example, stall, or reject/kill and restart/recycle, etc.) since the background data is not guaranteed to be ready and correct for when the store data for the current store is delivered.

The microarchitecture disclosed herein avoids the halting or delaying or redoing of the current store when this situation occurs. Instead, when one of the double-word addresses of the current store matches one or more double-word addresses of a valid store queue entry, and the matching store queue entry that has the "I am most recent" state (called the background source entry) has not yet received its store data and merged it with background data to create the most recent data for that double-word, then the background source queue entry will be updated with a cold forwarding pointer state to be used when the background source entry does receive its store data 492. This cold forwarding pointer will point to the store queue entry that is being written by the current store (called the background destination entry), and the current store is allowed to continue its execution.

If one can assume that the store data will be delivered in program order, then it will be guaranteed that all required background data will be known before the next store to that double-word will need its background data. All that is required is determining which store queue entry needs its background data updated (if any) for each store as the store data is delivered. The cold forwarding pointer states provide this information. As store data is received, the associated store queue entry is checked for cold forwarding information. If cold store forwarding is determined to be needed, after the store data is merged with background data to create the new updated value for that double-word, the updated double-word is used to write the background data register for the background destination entry. Thus, the next store to this double-word now has its most recent background data for when its store data arrives. When this next store data arrives, it will be able to create a new fully up-to-date value for the double-word, and it will check whether there is another store to this double-word that requires cold forwarding, and so forth.

In some embodiments, a store forwarding mechanism (generally as described herein) all stores will be able to acquire background data in time for merging with store data via one of three mechanisms. That is, either background data will be sourced from the cache at the time of receiving the store addresses, or background data will be sourced from store forwarding registers at the time of receiving store addresses, or background data will be sourced from newly merged double-word values at the time the next most recent store (compared to the current store) receives its store data. This combination of mechanisms for an in-order execution processor removes or greatly reduces any performance costs related to halts in instruction execution due to store background data that is dependent on previous store updates. Retrieving background data and producing blocks of updated store data outside the cache allows for more flexible store forwarding mechanisms for loads or fetches that can improve performance by reducing halts in processing those instructions.

Technical effects and benefits include a microarchitecture and methods for implementing techniques for solving an overlap of stores. The techniques guarantee that the correct background data will always be written into the background data register (either by the cache or by older stores to the same block) before the background data is needed for store merging and provide minimal impact upon system performance.

Further, it should be recognized that the teachings herein may include other circuitry and components as necessary for providing the functions and features described herein. Although disclosed in terms of "microarchitecture" and a "microprocessor" these terms, and related terms, are merely illustrative of the invention and are not limiting. For example, the teachings herein may be useful for implementations of architecture and processors as well.

Generally presented herein are certain aspects of the invention, though the present invention may be applied in other embodiments not described herein. For example, other embodiments may be realized by changing the implementation to match the requirements of a given architecture or microarchitecture. Accordingly, it is considered such other embodiments known now or later devised are contemplated by and a part of this invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for storing data in a pipelined processor, the method comprising:
   issuing a store request that comprises a store address;
   determining whether the store address matches an address of a previous store instruction in a store address queue, the determining performed based on issuing the store request;
   based on determining that the store address does not match the address of the previous store instruction in the store address queue, reading out store background data from a cache of the processor based on the address and writing the store queue with the address and background data and setting a most recent state bit, the background data comprising data that is read from the cache but unmodified by the store request;
   based on determining that the store address does match the address of the previous store instruction in the store address queue, determining whether the entry in the store address queue comprising a set most recent state bit comprises store data for forwarding, the set most recent state bit indicating a most recent entry in the store address queue matching the address of the previous store instruction and including the store data to be provided as part of the background data; and
   based on determining that the entry in the store address queue comprising the set most recent state bit does not comprise store data for forwarding, for the most recent entry in the store address queue that matched, updating a cold forwarding state of the matching entry to point to a new entry in a store queue for the store request, resetting the most recent state bit and writing a store address and setting a state bit of the new entry signifying the most recent entry, the cold forwarding state indicating that the store data is to be forwarded as part of the background data after the store data for the entry is received.

2. The method as in claim 1, further comprising:
   based on determining that the matching entry does not comprise store data for forwarding, using updated data for the matching entry to write the store queue entry when store data is provided for the entry comprising the cold forwarding state.

3. The method as in claim 1, further comprising:
   based on determining that the entry in the store address queue comprising the set most recent state bit comprises store data for forwarding, obtaining the most recent background data from a store data queue and writing a store queue with the address and background data and setting a most recent state bit.

4. The method as in claim 1, further comprising writing a store data queue entry with the background data.

5. A method for store forwarding in a pipelined processor, the method comprising:
   receiving a data store address for a current store request;
   obtaining current background data for the current store request, the current background data at a background data address and comprising at least one complete block of data that includes data locations corresponding to the data store address;
   determining whether there is a pending store request associated with the background data address to modify the current background data at the background data address, the determining based on receiving the data store address for the current store request, the pending store request received prior to the current store request, and the pending store request associated with a previous version of the background data obtained prior to obtaining the current background data for the current store request;
   based on determining that there is a pending store request associated with the background data address:
      receiving store data for the pending store request;
      merging the store data for the pending store request with the previous version of the background data; and
      modifying the current background data for the current store request with results of merging the store data for the pending store request with the previous version of the background data, wherein a portion of one or more of the current background data and the previous version of the background data comprises data read from a cache memory;
   receiving store data for the current store request;
   merging the store data for the current store request with the current background data; and
   storing the results of merging the store data for the current store request with the current background data.

6. The method of claim 5, wherein a number of bits in the store data for the current store request is less than a number of bits in the current background data.

7. The method of claim 5, wherein the storing is to a store data queue.

8. The method of claim 5, wherein the storing is to cache memory.

9. The method of claim 5, wherein the current store request is a variable length data store request.

10. The method of claim 5, wherein it is determined that there is at least one additional pending store request associated with the background data address, the at least one additional pending store request received prior to both the current store request and the pending store request, and the at least one additional pending store request associated with at least one previous version of the background data obtained prior to obtaining both the current background data and the previous version of the background data, wherein the previous version of the background data reflects a merging of all of the at least one previous versions of the background data and store data for all of the at least one additional pending store requests.

11. A system for store forwarding, the system comprising a pipelined processor configured to perform a method comprising:
receiving a data store address for a current store request;
obtaining current background data for the current store request, the current background data at a background data address and comprising at least one complete block of data that includes data locations corresponding to the data store address;
determining whether there is a pending store request associated with the background data address to modify the current background data at the background data address, the determining based on receiving the data store address for the current store request, the pending store request received prior to the current store request, and the pending store request associated with a previous version of the background data obtained prior to obtaining the current background data for the current store request;
based on determining that there is a pending store request associated with the background data address:
receiving store data for the pending store request;
merging the store data for the pending store request with the previous version of the background data; and
modifying the current background data for the current store request with results of merging the store data for the pending store request with the previous version of the background data, wherein a portion of one or more of the current background data and the previous version of the background data comprises data read from a cache memory;
receiving store data for the current store request;
merging the store data for the current store request with the current background data; and
storing the results of merging the store data for the current store request with the current background data.

12. The system of claim 11, wherein a number of bits in the store data for the current store request is less than a number of bits in the current background data.

13. The system of claim 11, wherein the storing is to a store data queue.

14. The system of claim 11, wherein the storing is to the cache memory.

15. The system of claim 11, wherein the current store request is a variable length data store request.

16. The system of claim 11, wherein it is determined that there is at least one additional pending store request associated with the background data address, the at least one additional pending store request received prior to both the current store request and the pending store request, and the at least one additional pending store request associated with at least one previous version of the background data obtained prior to obtaining both the current background data and the previous version of the background data, wherein the previous version of the background data reflects a merging of all of the at least one previous versions of the background data and store data for all of the at least one additional pending store requests.

* * * * *